Feb. 7, 1956 A. V. NANNI 2,733,620
INDEX PLATE
Filed Aug. 13, 1951
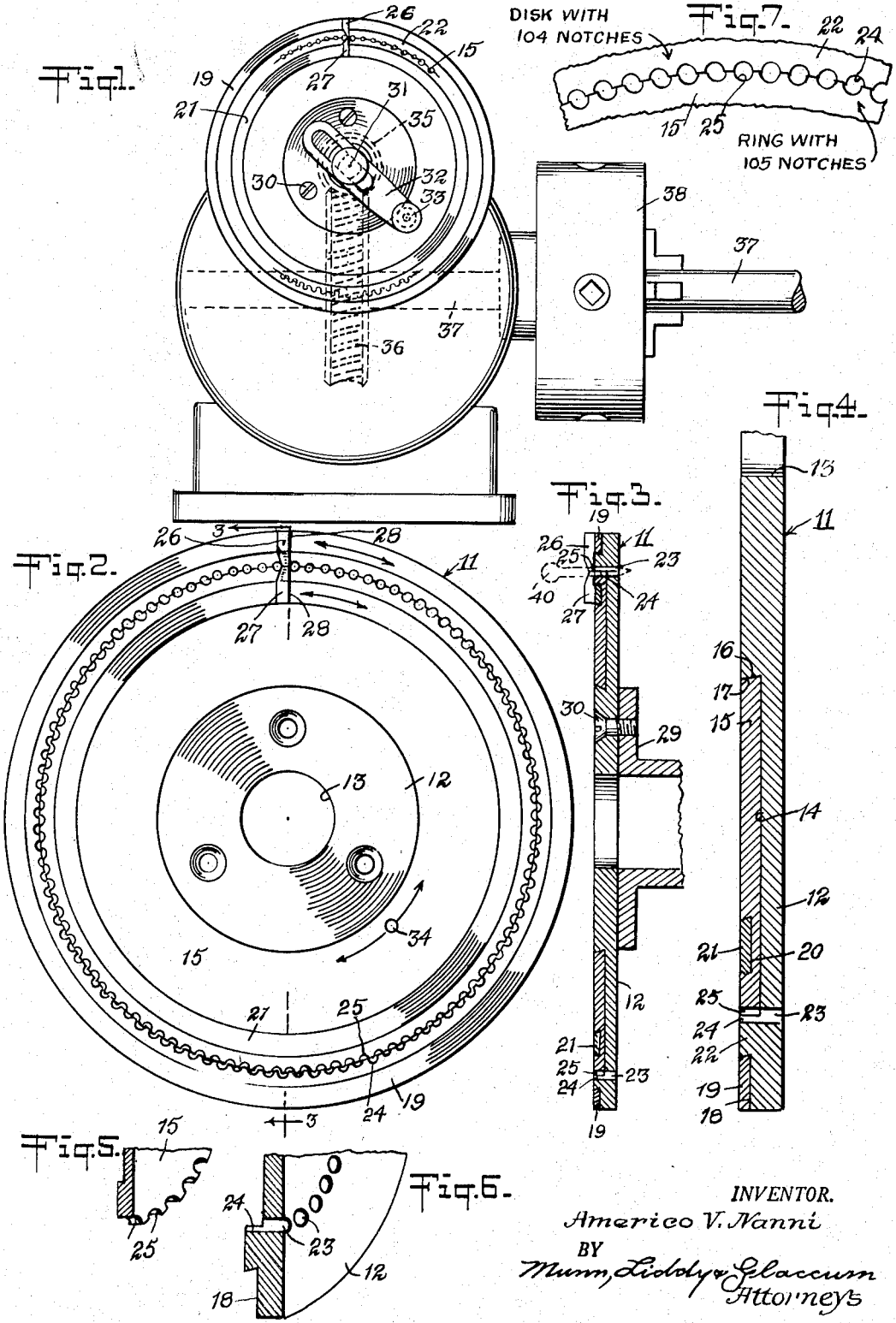
INVENTOR.
Americo V. Nanni
BY
Munn, Liddy & Glaccum
Attorneys

United States Patent Office 2,733,620
Patented Feb. 7, 1956

2,733,620
INDEX PLATE
Americo V. Nanni, Woodcliff Lake, N. J.
Application August 13, 1951, Serial No. 241,601
4 Claims. (Cl. 74—813)

The present invention relates to an indexing device which is designed and adapted to enable an operator of a machine tool to produce work as accurately as possible. More particularly, the present invention relates to an index plate which is adapted to be mounted on the dividing head of a milling machine and which permits the operator to obtain accurately within limits of tolerance any particular angular dimension or division.

Heretofore, in the operation of milling machines, it was necessary to use individual dividing head index plates, depending on the number of divisions required. The continual changing of dividing head index plates necessarily slowed down the entire operation and was bothersome to the operator. To overcome this difficulty, dividing head index plates were designed which had multiple series of concentric holes on the plates so that more divisions could be attained by any single plate. However, due to the limitation on the size of the plate, not all possible divisions could be obtained so that the need for changing plates was not totally eliminated. Moreover, the chances of human error were greatly increased due to the hundreds of holes in each plate.

It is a principal object of the present invention to provide for milling machines and the like a dividing head index plate which can give any angular division or dimension within acceptable tolerances.

It is a further object of the present invention to provide a dividing head index plate for milling machines which is in continuous reference with the work.

A still further object of the present invention is the provision of a dividing head index plate for milling machines which is of simplified construction, which is easy and convenient to operate and which may be manufactured at a comparatively low cost.

One advantage of the present invention is that the index plate can be permanently attached to the dividing head of a milling machine and used for any particular division thereby eliminating the necessity of changing plates.

Another advantage residing in the present invention is that the opportunity for human error in the operation of the index plate is enormously reduced.

A still further advantage is that the time required to do a given operation on the milling machine is considerably lessened.

Other objects and advantages will become more apparent as the present invention is described in detail below, with particular reference to the accompanying drawings wherein:

Fig. 1 is a front elevational view showing the index plate of the present invention attached to the dividing head of a machine tool (not shown), such as a milling machine;

Fig. 2 is an enlarged front view of the plate detached;

Fig. 3 is a sectional view of the present invention taken on the line 3—3 of Fig. 2, and looking in the direction of the arrows, but showing the index plate attached to the dividing head of a machine tool (not shown), such as a milling machine;

Fig. 4 is a fragmentary sectional view of Fig. 3 showing certain features on an enlarged scale;

Fig. 5 is a fragmentary sectional perspective view of the edge of the index ring;

Fig. 6 is a fragmentary sectional perspective view of the index disk; and

Fig. 7 is a fragmentary front view showing the concentric index systems on an enlarged scale.

In accordance with the present invention, I have provided a precision index plate for the dividing heads of milling machines and the like, which index plate can give any particular angular division or dimension within acceptable tolerances and which is in continuous reference at all times with the work. This dividing head index plate is mounted on the dividing head of a milling machine and comprises an index ring rotatable seated in an index disk, a pair of sector rings, one of the sector rings rotatably seated in the index ring and the other rotatably seated in the index disk, and the sector rings having cooperating indexing systems thereon, the disk and all the rings being concentric to a common center.

With particular reference to Fig. 2, there is shown a dividing head index plate 11 comprising an index disk 12 having a central bore 13 and an annular groove or recess 14 in the face thereof, which groove or recess is concentric to the bore 13. The recess 14 is adapted to receive loosely the index ring 15. The index ring 15 has a chamfered surface 16 which conforms with the chamfered surface 17 of the annular recess 14. The index ring 15 itself conforms to the recess 14, and when seated therein loosely occupies the recess 14 flush with adjacent surfaces of the disk 12 so as to be rotatable with respect to the disk. Due to the chamfered surfaces 16 and 17, the index ring 15 can be snapped into position in the recess 14 and held there without any impairment to its ability to rotate.

On the outermost portion of the face of the disk 12 is a chamfered annular recessed shelf or ledge 18 adapted to receive a correspondingly chamfered outer sector ring 19. The outer sector ring 19 loosely fits into and conforms with the recessed shelf 18 so as to be rotatable with respect to the disk 12.

In the face of the index ring 15 and near its periphery is a further chamfered annular recess 20, which is concentric to the bore 13 and adapted to loosely receive the correspondingly chamfered inner sector ring 21. The ring 21 fits into and conforms with the recess 20 so as to be rotatable with respect to both the disk 12 and the index ring 15.

Both sector rings 19 and 21 can be snapped into their respective recesses 18 and 20 and held there by the action of the chamfered surfaces. At the same time, surfaces of the rings 19 and 21 are flush with all corresponding adjacent surfaces. It should be noted that the degree of chamfering of index ring 15 and sector rings 19 and 21 and the recesses into which they fit has been exaggerated in the drawings for purposes of clarity. In practice, the inside diameter of the rings is only of the order of 0.003 inch or 0.004 inch smaller than the inside diameter of the recesses. Thus, while the rings may not be able to be snapped in by hand, they may be snapped or pressed in by means of a press.

Between the annular recessed shelf 18 and the annular recess 14 of the disk 12, there is an annular rib portion 22 which is also concentric to the bore 13. A circular series of equally spaced apart round holes 23, concentric to the bore 13 of the disk 12, is formed in the disk. Each of the holes 23 merges into a half-round or semi-cylindrical groove or notch 24 in the inner periphery of the rib portion 22. There are one hundred and four (104) holes 23 and a similar number of grooves 24, which latter are continuations of the holes 23.

A circular series of equally spaced apart half-round or semi-cylindrical grooves or notches 25 is formed in the outer peripheral edge of the index ring 15. This series is also concentric to the bore 13. There are one hundred and five (105) such grooves or notches 25 and they are of the same size as the grooves or notches 24. When one of the notches 24 is directly opposed to a notch 25, it will form a hole having the same diameter as the holes 23. However, regardless of the position of the index ring 15 with respect to the disk 12, only one notch at a time on the ring will perfectly match an opposing notch on the disk to form a perfect round hole, as shown in Fig. 7.

The holes 23 and notches 24 and 25 cooperate to constitute an index system, the operation of which will be explained below at a later point.

Each sector ring, 19 and 21, has a finger, 26 and 27 respectively, which is fixably attached thereto. The finger 26 points toward the center of the disk 12 and the finger 27 points away from the center. Each finger 26 and 27 has one flat side 28 which may be disposed radially with respect to the center of the disk 12, and both flat sides 28 may be brought into radial registry with each other, as shown in Figs. 1 and 2. At the same time the fingers 26 and 27 each serve as a handle to impart rotary motion to their respective sector rings.

The index disk 12 is permanently mounted on a face plate or flange 29 of a dividing head of a milling machine (not shown), or the like, by means of machine screws 30. One end of a stub shaft 31 extends through the bore 13 and is adjustably connected in suitable manner to a crank handle 32 which in turn is operatively connected to the ring 15 by means of pin 33 detachably seated in the detent or hole 34 in the face of the ring. The other end of the stub shaft 31 is operatively connected to a worm 35 which meshes with a worm wheel 36. The worm wheel 36 embraces a spindle or arbor 37, which is supported by chuck 38. The spindle 37 is connected to and turns the work (not shown). When the crank handle 32 is rotated it imparts rotary motion to the index ring 15 and also turns the work (not shown) through the aid of the stub shaft 31, the worm 35, the worm wheel 36 and the spindle 37.

In order to lock the index ring 15 against movement after the particular angular division or dimension has been attained, a pin 40 (shown in phantom in Fig. 3) may be inserted through the two notches 24 and 25 which are in complete registry.

Below is a partial table to be used with a dividing head index plate mounted on the dividing head of a milling machine and wherein the worm-gear ratio is 40:1, i. e., 40 complete revolutions of the index ring 15 would result in one complete revolution of the spindle 37 and the work (not shown).

*Table*

[Max. error .000001″ per inch of circumference.]

| Division Required | Complete Turns of Crank | Notches to Register | | Error per Div. per inch of circumference |
|---|---|---|---|---|
| | | Index Ring | Index Disk | |
| 2 | 20 | 0 | 0 | 0 |
| 3 | 13 | 70 | 0 | 0 |
| 4 | 10 | 0 | 0 | 0 |
| 5 | 8 | 0 | 0 | 0 |
| 6 | 6 | 35 | 0 | 0 |
| 7 | 5 | 30 | 0 | 0 |
| 8 | 5 | 0 | 0 | 0 |
| 9 | 4 | 23 | 69 | +.0000008″ |
| 10 | 4 | 0 | 0 | 0 |
| 11 | 3 | 19 | 85 | +.0000002″ |
| 12 | 3 | 70 | 0 | 0 |
| 13 | 3 | 0 | 8 | 0 |
| 14 | 2 | 15 | 0 | 0 |
| 15 | 2 | 35 | 0 | 0 |
| 16 | 2 | 0 | 52 | 0 |
| 17 | 2 | 74 | 6 | +.0000003″ |
| 18 | 2 | 12 | 35 | −.0000008″ |
| 19 | 2 | 99 | 5 | +.000001″ |
| 20 | 2 | 0 | 0 | 0 |
| 21 | 1 | 10 | 0 | 0 |
| 22 | 1 | 10 | 95 | −.000001″ |
| 23 | 1 | 91 | 63 | +.0000007″ |
| 24 | 1 | 35 | 0 | 0 |
| 25 | 1 | 42 | 0 | 0 |
| 26 | 1 | 0 | 56 | 0 |
| 27 | 1 | 8 | 58 | −.0000005″ |
| 28 | 1 | 60 | 0 | 0 |
| 29 | 1 | 47 | 86 | +.0000001″ |
| 30 | 1 | 70 | 0 | 0 |

Operation of the dividing head index plate is illustrated in connection with the following example wherein it is desired to mill the work in 21 equal divisions. Consulting the table, it is seen that between each operation on the work, the index ring 15 must be turned clockwise one complete revolution and, in addition, it must be further turned until notch #10 on the index ring is in registry with the #0 notch on the disk. To commence the operation, both sector rings 19 and 21 are rotated until the fingers 26 and 27 are positioned at the top of the dividing head index plate 11, as shown in Fig. 2. The pin 40 is inserted through the notches 24 and 25 which are adjacent the flat sides 28 of the fingers 26 and 27. This locks the index ring 15 against rotation and at the same time brings into registry the above two notches, which are designated as to the #0 notches. The necessary operation is then performed on the work. To obtain the next desired position on the work, the operator counts clockwise on the index ring 15 starting with the #0 notch until he reaches the #10 notch. A mark, such as a pencil mark, is made opposite the #10 notch on the inner sector ring 21 to aid in identifying the #10 notch. The pin 40 is then removed. Next the crank handle 32 is turned clockwise through one complete revolution so that both index ring 15 and sector ring 21 are rotated one revolution in a clockwise direction. Then the handle is still further turned until the #10 notch on the index ring 15 is opposite the #0 notch on the index disk 12. At this point, the pin 40 is re-inserted through the #10 and #0 notches to bring them into complete registry and further lock the index ring 15 against rotation. Now the work has been turned to the proper division and is ready for the second operation.

After the second milling operation is finished, the inner sector ring 21 is rotated until the finger 27 abuts the pin 40. The pin is then removed and the index ring 15 is again rotated as described above to reach the next desired angular division or dimension. These steps are repeated until all 21 equal divisions have been made on the work.

My device can be used for any worm-gear ratio without departing from the spirit of the invention. Furthermore, it is not pertinent to the invention that the dividing head plate have the number of notches shown in the accompanying drawings. Of course it is obvious that the more notches there are in the dividing head plate, the more accurate will be the results obtained.

However, it is critical to the invention that there always be a difference of one notch between the number of notches in the index ring and the number of notches in the index disk. If the number of notches in the index disk is less by 1 than the number of notches in the index ring, as shown in the accompanying drawings, then the index ring is to be turned clockwise in its operation; but, if the number of notches in the index ring is less by 1 than the number of notches in the index disk, then the index ring is to be rotated in counter-clockwise fashion to attain the same result.

It is to be understood that throughout this specification and the appended claims, the expression "dividing head" refers to that attachment for a machine tool, such as a milling machine, boring mill, grinding machine, and the like, etc., which is designed to move the work piece angularly. The dividing head usually comprises the arrangement of a worm, worm-wheel and arbor, etc., as shown in Fig. 1, all of which are operatively connected to each other. The dividing head is detachable from and may be connected to any of the machine tools which calls for its use. Thus my index plate may be employed with any machine tool which utilizes a dividing head and is not limited in use to a milling machine.

While the invention has been described in detail and shown with respect to the accompanying drawings, it is not to be limited to such details, since many changes and modifications may be made in the invention without departing from the spirit and scope thereof. Hence, it is desired to cover any and all forms and modifications of the invention which may come within the language and scope of any one or more of the appended claims.

I claim:

1. A dividing head index plate comprising an index disk having an index ring rotatably seated therein, and a pair of sector rings carried by and rotatably seated in the index ring and index disk respectively, the index ring and index disk each having co-extensive circular edge portions, each edge portion being provided with a circular series of notches and being accessible to view, the number of notches in each series differing by one and any notch in one of said series being adapted to register with any other notch in the other series; and indicator means on said sector rings, cooperable with a pin receivable in a registering pair of notches, to enable the sector rings to be initially located in predetermined indicating positions, either of said sector rings being shiftable to enable said indicator means thereof to designate a notch removed by a given number from the registering notches, and retaining its shifted position with respect to its carrier during relative movement of the index disk and index ring, thereby to facilitate readjustment of the same without the necessity of repeatedly counting notches for said readjustment.

2. A dividing head index plate comprising an index disk having an index ring rotatably seated therein, and a pair of sector rings carried by and rotatably seated in the index ring and index disk respectively, the index ring and index disk each having co-extensive circular edge portions, each edge portion being provided with a circular series of semi-circular notches and being accessible to view, the number of said notches in each series differing by one, and any notch in one of said series adapted to register with any other notch in the other series; a circular pin receivable in a registering pair of notches; and indicator means on said sector rings, cooperable with said pin to enable the sector rings to be initially located in predetermined indicating positions, either of said sector rings being shiftable to enable said indicator means thereof to designate a notch removed by a given number from the registering notches, and retaining its shifted position with respect to its carrier during relative movement of the index disk and index ring, thereby to facilitate readjustment of the same without the necessity of repeatedly counting notches for said readjustment.

3. A dividing head index plate comprising an index disk having an index ring rotatably seated therein, and a pair of sector rings carried by and rotatably seated in the index ring and index disk respectively, the index ring and index disk each having co-extensive circular edge portions, each edge portion being provided with a circular series of notches and being accessible to view, the number of notches in each series differing by one, said sector rings having indicator means cooperable with a pin receivable in a registering pair of notches, to enable the sector rings to be initially located in predetermined indicating positions, either of said sector rings being shiftable to enable said indicator means thereof to designate a notch removed by a given number from the registering notches, and retaining its shifted position with respect to its carrier during relative movement of the index disk and index ring, thereby to facilitate readjustment of the same without the necessity of repeatedly counting notches for said readjustment.

4. A dividing head index plate wherein the work is in continuous reference to the plate, comprising an index disk having an annular recess therein, an index ring rotatably seated in said recess, said index disk having a series of holes located at the outer edge of said recess and extending through the disk to form a series of notches in said outer edge, said index ring being provided with a series of notches on its outer periphery, said notches on said index disk and on said index ring being accessible to view, differing in number by one and any notch in one of said series being adapted to register with any other notch in the other series, said ring having an annular recess; an inner sector ring inserted in said recess, the said disk at its outer edge being provided with a second annular recess; and an outer sector ring rotatably mounted in said second annular recess, said sector rings having indicator means cooperable with a pin receivable in a registering pair of notches, to enable the sector rings to be initially located in predetermined indicating positions, either of said sector rings being shiftable to enable said indicator means thereof to designate a notch removed by a given number from the registering notches, and retaining its shifted position with respect to its carrier during relative movement of the index disk and index ring, thereby to facilitate readjustment of the same without the necessity of repeatedly counting notches for said readjustment.

References Cited in the file of this patent

UNITED STATES PATENTS

| | | |
|---|---|---|
| 276,292 | Seymour | Apr. 24, 1883 |
| 893,954 | Van Huffel | July 21, 1908 |
| 1,454,181 | Muller | May 8, 1923 |
| 2,144,486 | Erb | Jan. 17, 1939 |
| 2,452,544 | Brodie | Nov. 2, 1948 |
| 2,468,325 | Eisele | Apr. 26, 1949 |

OTHER REFERENCES

American Machinist, page 168, Jan. 22, 1931. (Copy in Scientific Library, U. S. Patent Office.)